United States Patent
Shinbo et al.

[19]

[11] Patent Number: 6,139,407
[45] Date of Patent: *Oct. 31, 2000

[54] METHOD FOR PROCESSING USING BEAM OF MAGNETIC LINE OF FORCE, APPARATUS FOR CARRYING OUT SAID METHOD, AND CARRIAGE MEMBER FOR HARD DISK DRIVE PROCESSED BY SAID METHOD

[75] Inventors: Yoshinori Shinbo, Okaya; Takeo Shinmura, Utsunomiya, both of Japan

[73] Assignee: Kyoei Denko Co., Ltd., Okaya, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/015,051

[22] Filed: Jan. 28, 1998

[30] Foreign Application Priority Data

Jan. 30, 1997 [JP] Japan ..................................... 9-031132
Apr. 18, 1997 [JP] Japan ..................................... 9-101363

[51] Int. Cl.$^7$ ...................................................... B24B 31/06
[52] U.S. Cl. ............................ 451/113; 451/164; 451/114
[58] Field of Search .................................... 451/113, 104, 451/36, 164, 165, 114, 910

[56] References Cited

U.S. PATENT DOCUMENTS

| | | | |
|---|---|---|---|
| 2,883,809 | 4/1959 | Simjian | ................................... 451/113 |
| 2,923,100 | 2/1960 | Simjian | ................................... 451/113 |
| 4,175,930 | 11/1979 | Sakulevich et al. | ...................... 51/281 |
| 4,306,386 | 12/1981 | Sakulevich et al. | .................... 451/113 |
| 4,549,370 | 10/1985 | Makedonski et al. | ........................ 51/7 |

FOREIGN PATENT DOCUMENTS

| | | | |
|---|---|---|---|
| 36 34 409 | 10/1986 | Germany . | |
| 59-169759 | 9/1984 | Japan . | |
| 1265162 | 11/1986 | Japan | ...................................... 451/36 |
| 1370356 | 10/1974 | United Kingdom | ..................... 451/36 |

*Primary Examiner*—Robert A. Rose
*Attorney, Agent, or Firm*—Armstrong, Westerman, Hattori, McLeland & Naughton

[57] ABSTRACT

The present invention provides a method for processing such as deburring, polishing and washing of surfaces of slits of a workpiece, having slits with narrow width from outer surface toward inside, with high accuracy and high efficiency. Magnetic abrasive material is retained in a magnetic field formed between magnetic poles 3 and 4, and magnetic brushes 5 are formed. A workpiece 1 made of non-magnetic material and having slits 1f with narrow width is placed in said magnetic brushes 5, and by relatively vibrating said magnetic poles and said workpiece, surfaces of the slits are processed. It is more effective to tilt the slit surface with respect to the magnetic field after the slit surface is arranged in parallel to the magnetic field.

18 Claims, 15 Drawing Sheets

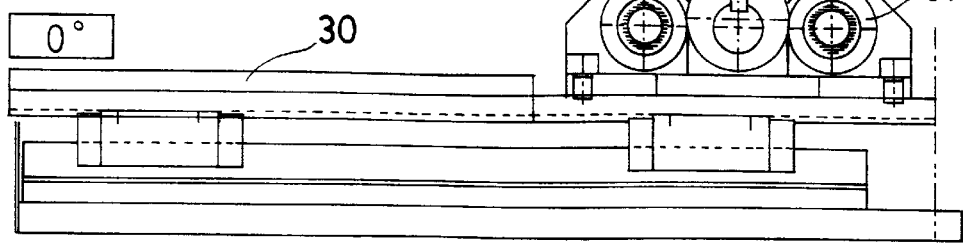
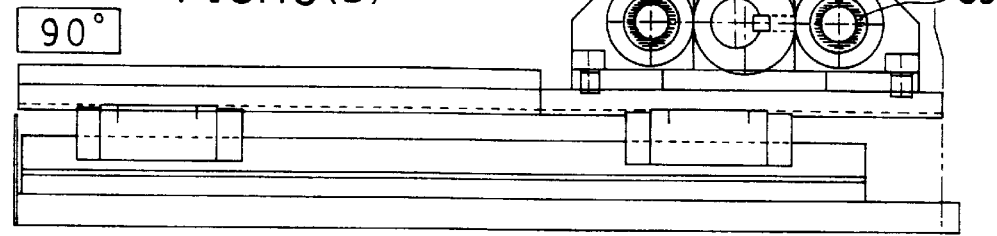
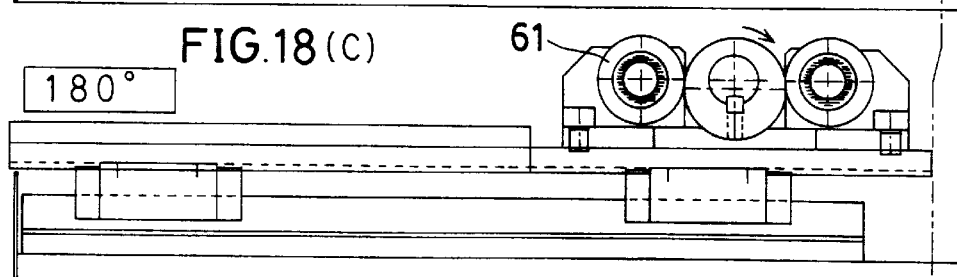
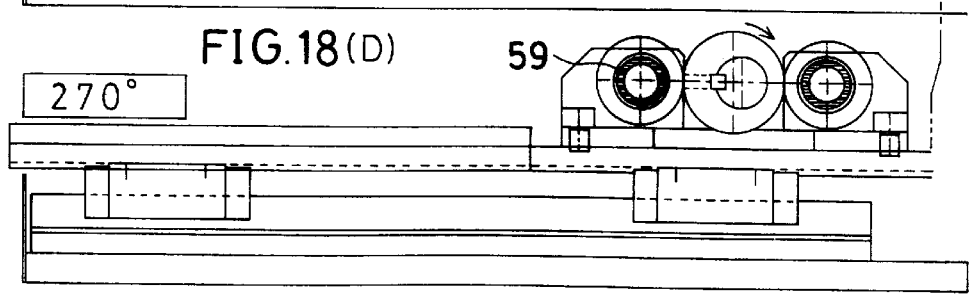
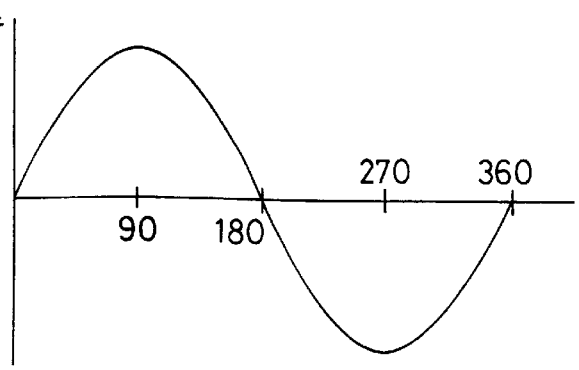

METHOD FOR PROCESSING USING BEAM OF MAGNETIC LINE OF FORCE, APPARATUS FOR CARRYING OUT SAID METHOD, AND CARRIAGE MEMBER FOR HARD DISK DRIVE PROCESSED BY SAID METHOD

BACKGROUND OF THE INVENTION

The present invention relates to a method for processing using beam of magnetic line of force which is applied for manufacture of precision parts comprising non-magnetic materials such as aluminum, stainless steel, synthetic resin, etc., and in particular, to a method for deburring, polishing and washing surfaces of a workpiece which has slits with narrow width from outer surface toward inside.

PRIOR ART

In the past, there have been much difficulties in deburring interior portions or inaccessible surfaces of precision parts, which comprise non-magnetic materials such as aluminum. For example, aluminum parts are produced by diecast molding, extrusion molding or drawing molding. The parts produced by diecast molding have less burrs but are very likely to contain cavities, and these parts cannot be used except for the applications where the parts of low quality may be allowed. Therefore, to produce precision parts, which require processing accuracy in the order of micron, such as a carriage member for magnetic head or hard disk drive (HDD) used for computer, blocks produced by extrusion molding or drawing molding are cut and machined although it is known that much burrs occur in this case.

FIG. 14 is a perspective view of a head arm member as described above, in which a carriage member 1 comprises a base 1a, a plurality of plates (arms) 1b machined in form of a comb and extending in parallel from the base 1a, and a plurality of slits 1f formed between the plates 1b. A support shaft hole 1c is formed on the base 1a. At the tip of each of the plates 1b each designed in approximately triangular shape in plan view, a head mounting hole 1d for mounting a magnetic head, and openings 1e to reduce the weight of the plates 1b are provided by machining. Said plurality of arms 1b are moved to enter between a plurality of disks of HDD, and the magnetic head reads information recorded on the disk. On outer periphery of each plate 1b or on corners of the holes 1c and 1d as well as on the openings 1e, burrs occur as the result of cutting and machining. If these parts are assembled without processing, burrs are brought into contact with disk, and disk surface may be damaged or burrs may be caught between the disk and the head, or cutting chips may drop on the disk and disk or head may be damaged. For this reason, it is necessary to perform deburring and chamfering on these parts. Further, films or other foreign objects may be attached on the plates 1b in the subsequent process to assemble the hard disk. Thus, these films and foreign objects must be washed away and removed.

However, in case of the above carriage member 1, in order to perform deburring for the holes 1c in the plates 1b in comb-like shape or on corners of openings 1e, it is difficult to automate the operation because tools cannot be inserted inside, and brushing requiring much manual work must be carried out. As a result, much fabricating and processing cost is needed for mere finishing process. Even when deburring is performed manually, it is often very difficult to deburr inside the carriage member 1 with complicated structure. In this respect, the structure of the carriage member 1 must be more simplified, and this makes it difficult to produce the carriage member 1 in compact and lightweight design. The same applies not only to the case of the carriage member 1 but also to the case of surface processing or surface treatment of precision parts, which have narrow slits outside and openings or holes inside, and this causes hindrances in the manufacture of various types of products.

Other methods of deburring such as electrolytic polishing, shot blasting or ultrasonic polishing may be adopted, whereas initial shape of the parts produced with accuracy in the order of micron may be impaired.

On the other hand, a technique to polish a workpiece in magnetic field is known, for example, from JP-B-57-1389. In this technique, however, no consideration is given on the case where the workpiece is a non-magnetic piece, and ferromagnetic abrasives are used. This causes problems in that the surface of relatively soft workpiece such as aluminum parts may be damaged. Also, when the workpiece is vibrated in ferromagnetic abrasives, strong force is applied on the workpiece, and it is difficult to retain the workpiece. In particular, in case a large quantity of workpieces are machined automatically, it is difficult to find an apparatus, which can firmly and removably retain the workpiece. Further, in case the carriage member 1 as shown in FIG. 14 is to be polished, it is difficult to deburr the holes 1c or 1d inside the plates 1b in comb-like shape or deburr corners of the openings 1e because the workpiece is vibrated in vertical direction.

SUMMARY OF THE INVENTION

To solve the above problems, it is a first object of the present invention to provide a method for processing using beam of magnetic line of force, by which it is possible to perform deburring, polishing and washing of surfaces of a workpiece, having narrow slits from outer surface to inner side, with high accuracy and high efficiency and processing such as deburring can be easily automated. The invention also provides an apparatus for performing said method. This is based on the observations that, when the workpiece is limited to a non-magnetic material, magnetic line of force passes through the workpiece as freely as X-ray, and magnetic brushes can be retained by the penetrating magnetic line of force, and magnetic force can be applied on the workpiece.

It is a second object of the present invention to provide a method for processing using beam of magnetic line of force and an apparatus for performing said method, by which it is possible to accurately aim sites to be processed inside a workpiece and to carry out deburring, polishing and washing of surfaces of a workpiece with high accuracy and high efficiency.

It is a third object of the present invention to provide a carriage member for hard disk drive processed by said method for processing using beam of magnetic line of force.

To attain the above objects, the method for processing using beam of magnetic line of force according to the present invention comprises the steps of retaining magnetic abrasive material in a magnetic field formed between magnetic poles and forming magnetic brushes, of arranging a workpiece made of non-magnetic material having slits with narrow width in said magnetic brushes, and of relatively vibrating said magnetic poles and said workpiece to process surfaces of said slits.

The apparatus for processing using beam of magnetic line of force comprises magnetic pole units 23 each connected to a vibration generating mechanism 22, at least a pair of magnetic poles 3 and 4 arranged on each of said magnetic pole units with spacings, magnetic abrasive material placed between said pair of magnetic poles to form magnetic brushes 5, a workpiece 1 made of non-magnetic material and retained by a retainer in said magnetic brushes, slits 1f with narrow width formed on outer surface of said workpiece and openings 1e and holes 1d formed in said workpiece, whereby the magnetic brushes are vibrated by said vibration generating mechanism to process surfaces of the workpiece.

According to the present invention, in case the workpiece having slits with narrow width from outer surface toward inside and having openings or holes inside is made of non-magnetic material such as aluminum, stainless steel, synthetic resin, etc., magnetic line of force freely passes through the workpiece. Accordingly, the workpiece can be processed regardless of shape or structure of the workpiece. Because relative vibration is given to the magnetic abrasive material, surface processing and treatment such as deburring, polishing, washing, etc. can be carried out with high accuracy and high efficiency, and deburring can be easily automated.

In normal processing or treatment, it is necessary to fix a cutting tool or other means on some other device. In the present invention, however, magnetic abrasive material comprising weak magnetic material is magnetically retained in a magnetic field, and there is no need to fix or set the tool. Thus, the apparatus for processing using beam of magnetic line of force is very effective for surface processing or surface treatment of precision parts, which tend to become more and more complicated and compact in recent years.

According to claims 7 to 9 of the present invention, it is possible to simplify the vibration mechanism and to reduce vibration noise. According to claim 10 of the invention, it is possible to provide complicated vibration.

Further, according to claim 11 of the invention, it is possible to firmly retain a workpiece using a robot by utilizing a support hole, which is formed on the workpiece in advance.

According to claim 12 of the present invention, a pin comprising weak magnetic material is used as the magnetic abrasive material. This makes it possible to perform deburring, polishing and washing without adversely affecting surface accuracy of the precision parts and to prevent the magnetic abrasive material to move toward backside of the magnetic pole. Because the magnetic abrasive material of weak magnetic material is vibrated, it is possible to accurately aim a site to be processed on the workpiece and to perform deburring, polishing and washing of surfaces of the workpiece with high accuracy and high efficiency.

According to claim 13 of the present invention, high frequency vibration is given to the workpiece, and it is possible to perform processing such as deburring, polishing and washing of surfaces of the workpiece with high accuracy.

According to claim 14 of the present invention, the surface to be processed of the workpiece is 3-dimensionally varied with respect to direction of the magnetic field generated by the magnetic poles. This makes it possible to perform processing for the usually inaccessible site where hand or ordinary tool cannot reach, i.e. inside the slit, inside the hole or surfaces of the plates arranged in parallel to each other, without additional cost.

According to claim 15 of the present invention, a magnetic brush control member is used, and this makes it possible to prevent the magnetic abrasive material, as placed between opposed magnetic poles, from moving toward opposite side and to always align the magnetic brushes between the magnetic poles.

According to claims 16 and 17 of the present invention, magnetic field intensity is changed in a direction perpendicular to the direction of magnetic line of force, and this makes it possible to improve processing efficiency.

According to claim 18 of the present invention, cutting chips of the polished workpiece are washed away and removed using oil or other liquid, and this makes it possible to maintain the magnetic brushes always in stabilized condition.

BRIEF DESCRIPTION OF THE DRAWINGS

FIG. 3 shows a magnetic pole unit of the apparatus of FIG. 1, where

FIG. 5 schematically explains a method for processing using beam of magnetic line of force of the present invention, where

FIG. 18 represents drawings to explain operation in the embodiment of FIG. 15 to FIG. 16;

FIG. 19(A) is a side view, and FIG. 19(B) is a front view.

DESCRIPTION OF THE PREFERRED EMBODIMENTS

Figure 1:
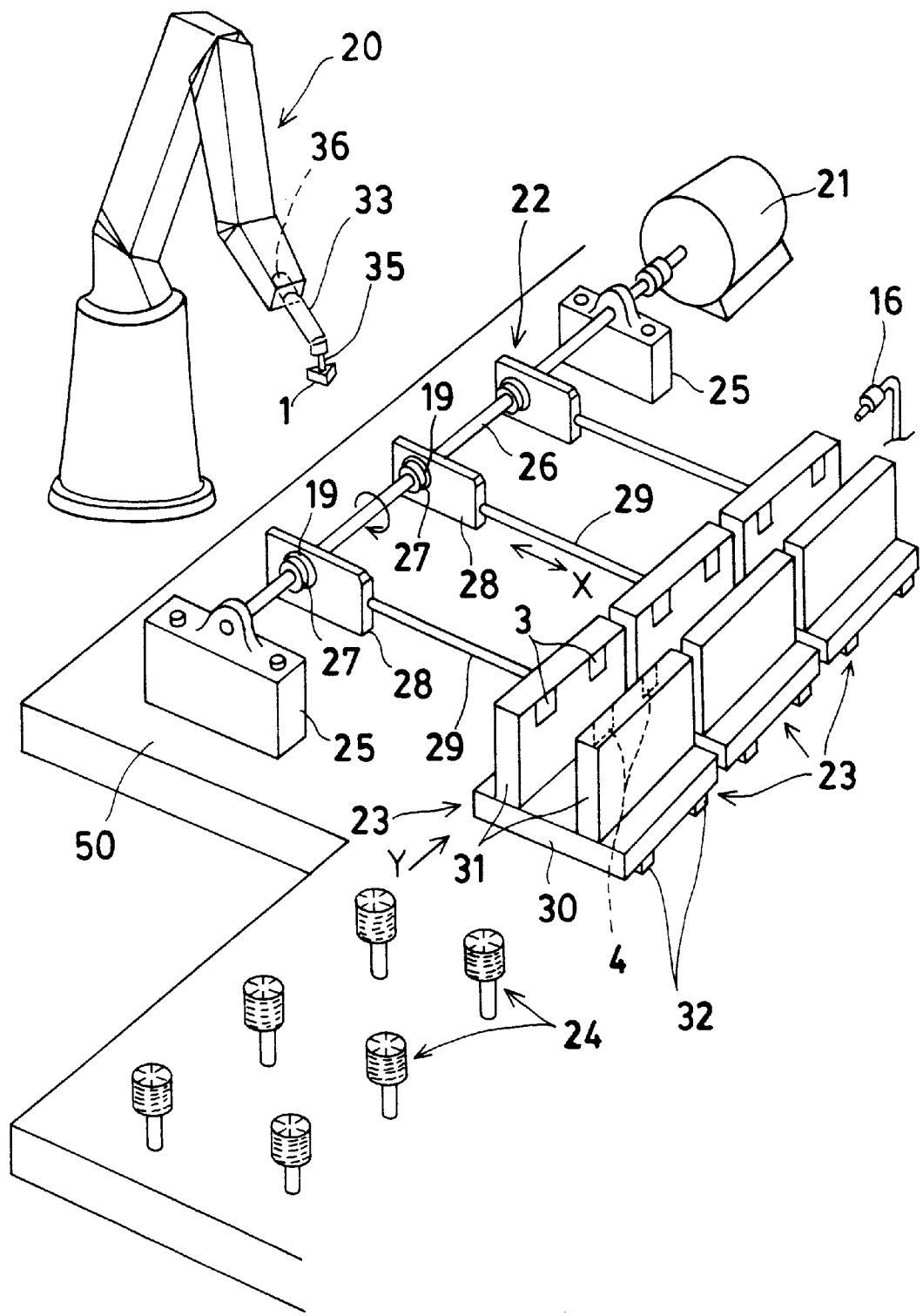
FIG. 1 is an overall perspective view of an embodiment of an apparatus for processing using beam of magnetic line of force according to the present invention.

In the following, description will be given on embodiments of the present invention referring to the attached drawings. FIG. 1 is an overall perspective view of an embodiment of an apparatus for processing using beam of magnetic line of force of the present invention. As shown in FIG. 1, the apparatus for processing using beam of magnetic line of force according to the present invention comprises a robot 20, and further, an electric motor 21, a vibration generating mechanism 22, a plurality of magnetic pole units 23 (3 units shown in the figure), and nylon brush groups 24 containing abrasive grains for rough polishing, all of these arranged on a base 50. The vibration generating mechanism 22 is rotatably and pivotally supported on bearings 25 and 25 fixed on the base 50, and it comprises a rotation shaft 26 connected with the electric motor 21, a plurality of eccentric cams 27 fixed on the rotation shaft 26, operation plates 28 mounted on the eccentric cams 27 via bearings 19, and sliding rods 29 connected to the operation plates 28. Rotation of the rotation shaft 26 is converted to reciprocal movement of the sliding rods 29 via the eccentric cams 27.

Each of the magnetic pole units 23 comprises a base 30, a pair of magnetic pole support members 31 arranged face-to-face to each other on the base 30, and a magnetic pole 3 (e.g. N pole) and a magnetic pole 4 (e.g. S pole) having different polarities and arranged face-to-face to each other on the magnetic pole support member 31. The base 30 is slidably arranged on rails 32 placed on the base 50 and is connected with the sliding rods 29 so that the magnetic units 23 are vibrated. Between the magnetic poles 3 and 4, a magnetic abrasive material made of weak magnetic pin is placed. Along magnetic line of force between the magnetic poles 3 and 4, magnetic brushes (to be described later) are formed, in which the magnetic abrasive material made of weak magnetic material is aligned. Over each of the magnetic pole units 23, an injection nozzle 16 for injecting liquid for washing or processing is disposed (to be disposed for each magnetic pole unit, although only one nozzle is shown in the figure) so that oil or liquid is injected into the magnetic pole units 23 to remove polishing or cutting chips from the magnetic brushes.

On a revolving arm 33 of the robot 20, a workpiece retaining finger 35 is rotatably mounted, and a workpiece 1 (e.g. a head arm member 1 shown in FIG. 14) is removably mounted and retained. At the base of the revolving arm 33, an ultrasonic or high frequency vibrator 36 is mounted. In the figure, only one robot 20 is shown, while as many robots as the magnetic pole units are normally arranged around the magnetic pole units 23. In the present invention, the robots may not necessarily be used, and a retaining device to removably retain the workpiece 1 may be adopted.

Figure 2:
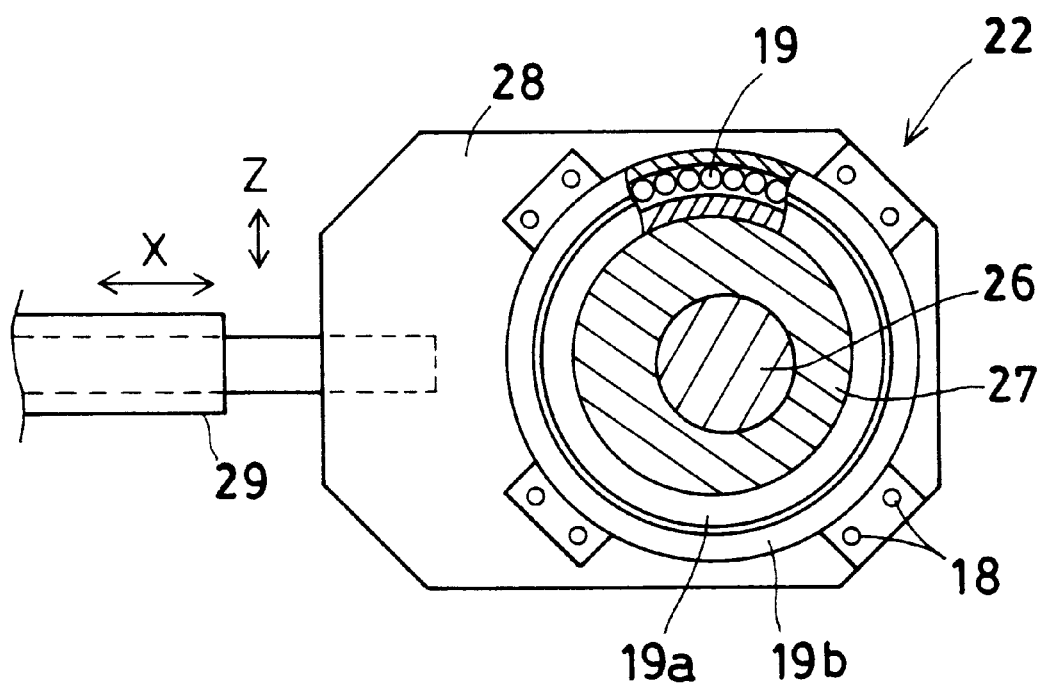
FIG. 2 is a cross-sectional view of a vibration generating mechanism of the apparatus of FIG. 1.

FIG. 2 is a cross-sectional view of a vibration generating mechanism 22 in the apparatus of FIG. 1. On a rotation shaft 26, an eccentric cam 27 is fixed, and an inner race 19a of a bearing 19 is fixed on the eccentric cam 27. On an operation plate 28, an outer race 19b of the bearing 19 is fixed using screws 18, and rotation of the rotation shaft 26 is converted to reciprocal movement of a sliding rod 29 via the eccentric cam 27 and the bearing 19. In the present invention, however, rotation is converted to reciprocal movement of the sliding rod 29 via the eccentric cam 27, and the reciprocal movement of the tip of the sliding rod 29 is 3-dimensional vibration, which is composed of a minute vertical vibration component in Z direction and a minute horizontal vibration component in Y direction (FIG. 1) in addition to a horizontal vibration component in X direction. In addition, the base 50 may be vibrated in horizontal vibration or 3-dimensional vibration.

Figure 3A:
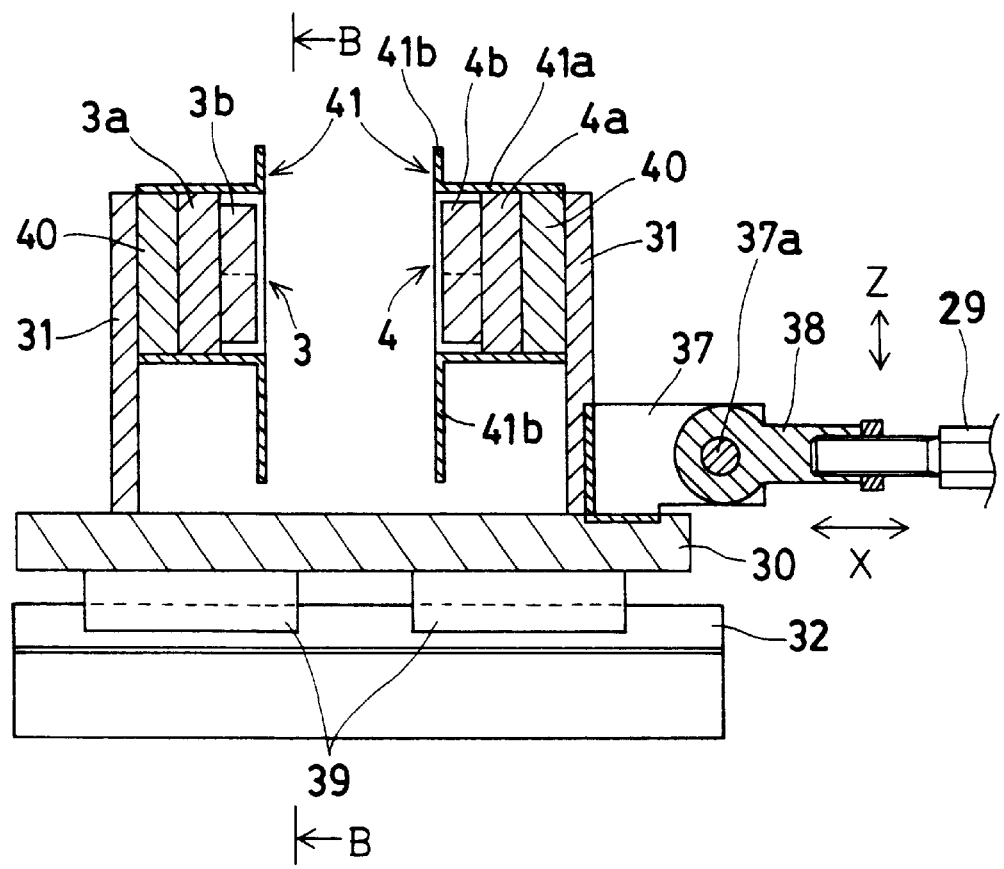
FIG. 3(A) is a cross-sectional view.
Figure 3B:
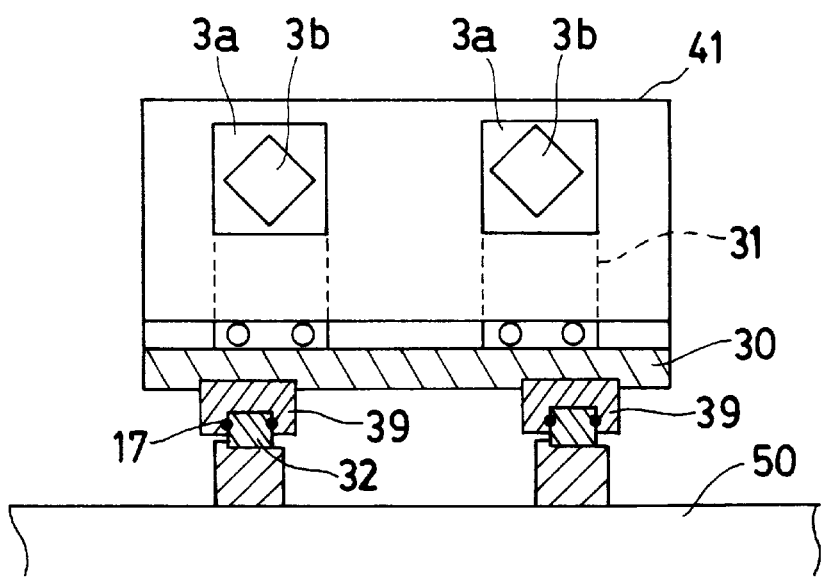
FIG. 3(B) is a cross-sectional view along the line B—B in FIG. 3(A) as seen from the direction of arrow.

FIG. 3 shows one of the magnetic pole unit 23 in the apparatus of FIG. 1. FIG. 3(A) is a cross-sectional view, and FIG. 3(B) is a sectional view along the line B—B of FIG. 3(A) as seen from the direction of arrow. On the base 30, a bracket 37 having a pivot shaft 37a is arranged. A rotation pin 38 is pivotally supported on the pivot shaft 37a, and a sliding rod 29 is connected to the rotation pin 38, and this allows elliptical movement of the tip of the sliding rod 29. On the lower surface of the base 30, guide members 39 are provided and are slidably placed on rails 32 via bearings 17. On each of magnetic pole support members 31, a yoke 40 and magnetic poles 3 and 4 are fixed.

Each of the magnetic poles 3 and 4 comprises two magnetic poles 3a and 3b and magnetic poles 4a and 4b, each in rectangular shape and laminated on each other. As shown in FIG. 3(B), to one magnetic pole 3a, the other magnetic pole 3b is fixed at a position by rotating at an angle of 45°. The same applies to the magnetic poles 4a and 4b. It is arranged in such manner that the magnetic poles at opposed positions (i.e. 3a to 4a, and 3b to 4b) have different polarities (i.e. N pole and S pole). On outer periphery of each of the yoke 40 and the magnetic poles 3 and 4, a magnetic brush control plate 41 is fixed. The magnetic brush control plate 41 is made of non-magnetic material, and it comprises an outer peripheral portion 41a to cover outer periphery of each of the magnetic poles 3 and 4 and a control portion 41b extending in vertical and horizontal directions from the outer peripheral portion. The control portion 41b prevents the magnetic abrasive material, placed between the opposed magnetic poles 3 and 4, from moving toward the opposite side and also prevents the magnetic brushes from extending out of the space between the magnetic poles 3 and 4, thereby always aligning the magnetic brushes between the magnetic poles 3 and 4. If the control portion 41b is designed in semi-spherical shape or in form of a bowl, the better effect to control the magnetic brush can be obtained.

Figure 4A:
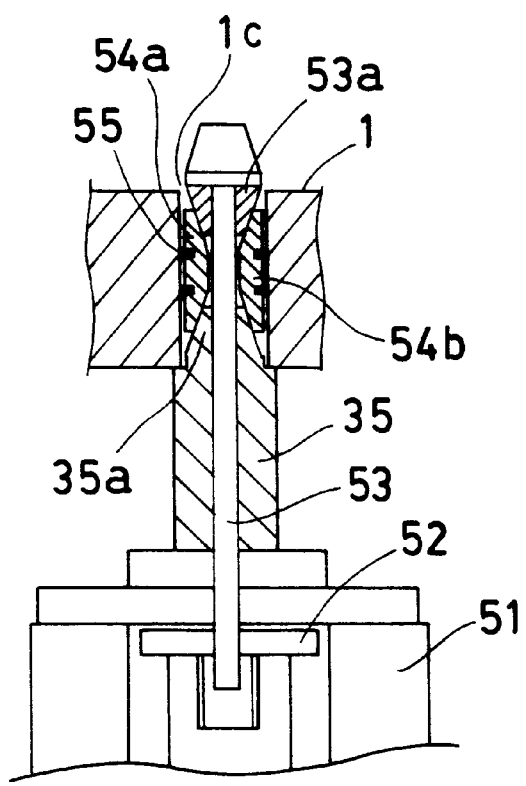
FIG. 4 shows a retaining finger of a robot 20 in the apparatus of FIG. 1, where FIGS. 4(A) and (B) each represents an axial sectional view.
FIG. 4(C) is a cross-sectional view along the line C—C in FIG. 4(B) as seen from the direction of arrow.
Figure 4B:
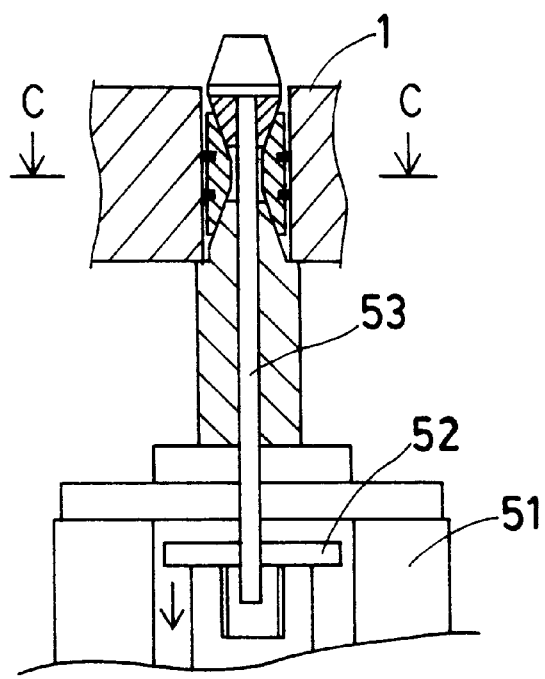
Figure 4C:
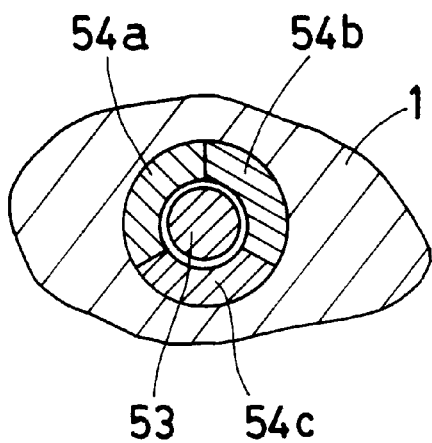

FIG. 4 shows a retaining finger 35 of the robot 20 in the apparatus of FIG. 1, where FIGS. 4(A) and (B) each represents an axial sectional view respectively, and FIG. 4(C) is a cross-sectional view along the line C—C in FIG. 4(B).

In FIG. 4(A), the retaining finger 35 is fixed on an air cylinder 51. In the retaining finger 35, a retaining rod 53 connected to a piston 52 of the air cylinder 51 is slidably engaged. On the tip of the retaining finger 35, a stopper 35a in conical shape is formed. On the tip of the retaining rod 53, a presser 53a in conical shape is fixed. Around the retaining rod 53, wedge members 54a, 54b and 54c, each in form of truncated trapezoid, are engaged between the stopper 35a and the presser 53a, and these are connected with each other by elastic rings 55.

FIG. 4(A) shows the condition where the retaining rod 53 of the retaining finger 35 is placed into a support hole 1c of the workpiece 1. When the air cylinder 51 is driven from this condition and the piston 52 is moved back as shown by an arrow in FIG. 4(B), upper ends of the wedge members 54a to 54c are pressed by the presser 53a of the retaining rod 53, and lower ends of the wedge members 54a to 54c are engaged along the stoppers 35a of the retaining finger 35. Then, the wedge members 54a to 54c are moved against the elastic rings 55 and are pressed on the workpiece 1, and the workpiece 1 is retained by the retaining finger 35. The retaining finger 35 with the workpiece 1 retained on it can be moved and rotated in 3-dimensional directions by the robot 20.

Figure 5A:
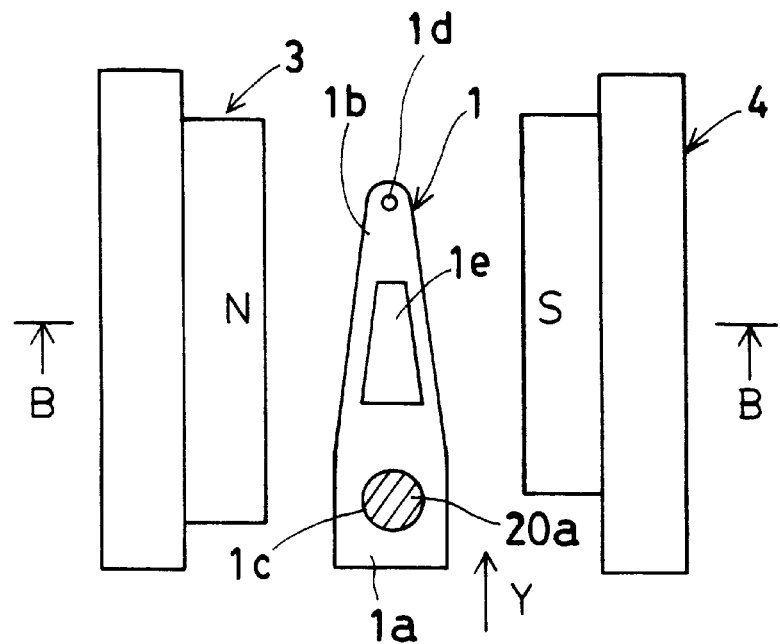
FIG. 5(A) is a plan view.
Figure 5B:
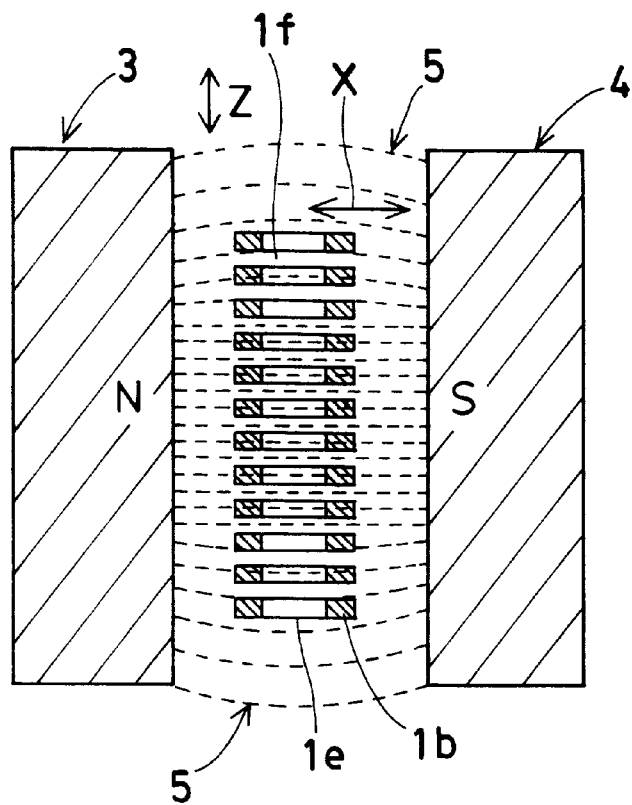
FIG. 5(B) is a cross-sectional view along the line B—B of FIG. 5(A) as seen from the direction of arrow.
Figure 6A:
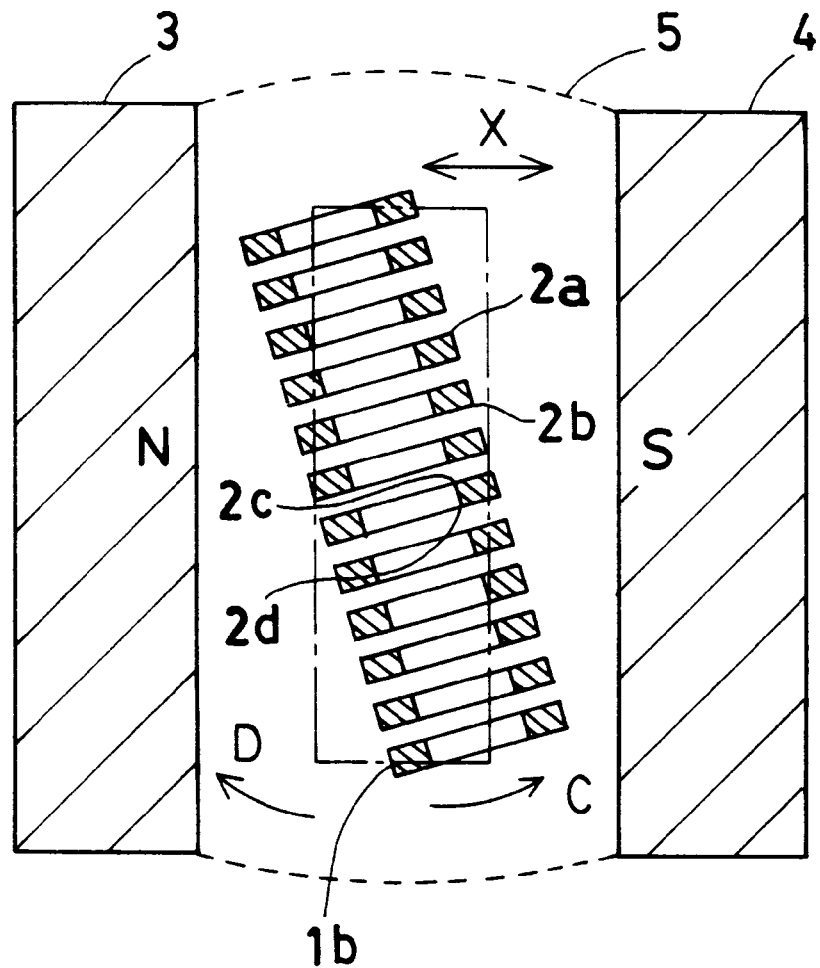
FIG. 6(A) is a cross-sectional view similar to FIG. 5(B) to explain a method for processing after FIG. 5.
Figure 6B:
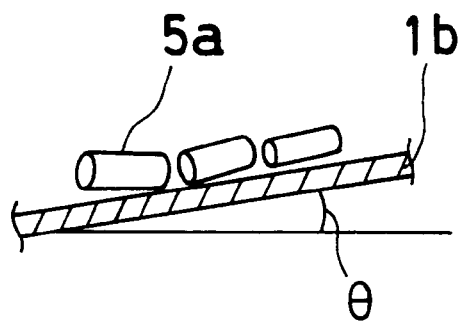
FIG. 6(B) is a partially enlarged cross-sectional view of FIG. 6(A)

FIG. 5 and FIG. 6 each schematically illustrates a method for processing using the apparatus for processing with beam of magnetic line of force. FIG. 5(A) is a plan view, FIG. 5(B) and FIG. 6(A) each represents a cross-sectional view along the line B—B in FIG. 5(A) as seen from the direction of arrow, and FIG. 6(B) is an enlarged cross-sectional view of FIG. 6(A).

Figure 14:
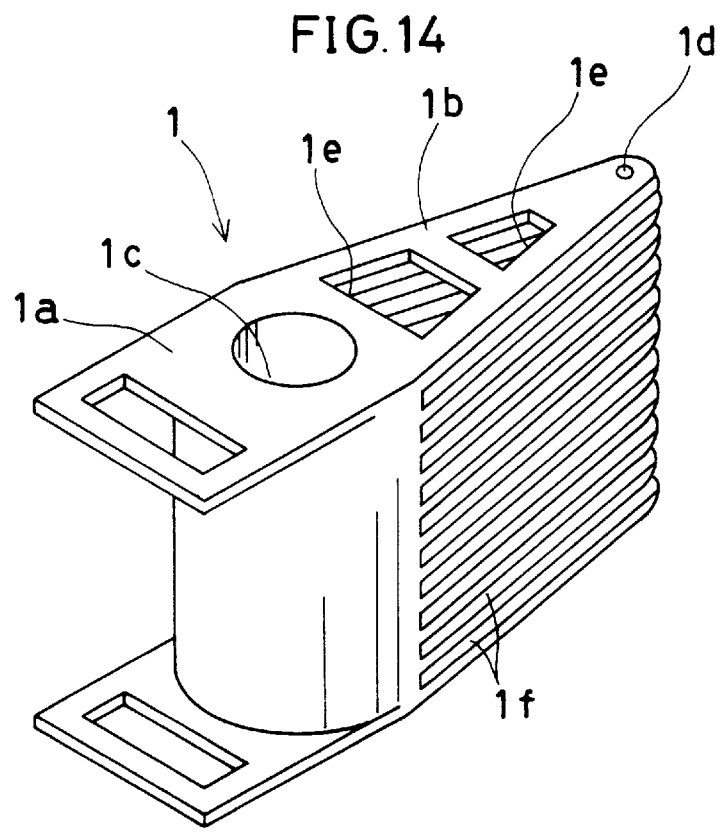
FIG. 14 is a perspective view of an example of a workpiece, to which the present invention is applied.

In this embodiment, polishing and deburring are performed on a carriage member 1 of hard disk drive as explained in connection with FIG. 14. As described in connection with FIG. 14, the workpiece 1 comprises a workpiece base 1*a* and a plurality of plates (arms) 1*b*, which are machined in form of a comb and extended in parallel to each other from the base 1*a*, and a plurality of slits If are formed between the plates 1*b*. A support hole 1*c* for supporting the workpiece 1 is formed on the base 1*a*. On the tip of each of the plates 1*b*, which is formed in approximately triangular shape in plan view, there are provided a head mounting hole 1*d* for mounting a magnetic head and an opening 1*e* to achieve lightweight design of the plate 1*b* by machining.

As shown in FIG. 5(A), the magnetic pole 3 (N pole) and the magnetic pole 4 (S pole) are arranged face-to-face to each other, and a magnetic abrasive material is placed between them. As the magnetic abrasive material, a weak magnetic material having relative magnetic permeability of 1.1 to 100, e.g. weak magnetic stainless steel (e.g. produced by cold working of 18-8 stainless steel) in cylindrical shape or polygonal shape with length of 0.5 to 1.5 mm is used. This causes no pricking on surface or no damage on surface of aluminum parts. By retaining the magnetic brushes between the magnetic poles with adequate retaining force, deburring, polishing or washing of surfaces of the workpiece can be carried out with high accuracy and high efficiency by accurately aiming the site to be processed on the workpiece. Also, it is possible to prevent the magnetic abrasive material from moving toward backside of the magnetic pole. Then, between the magnetic poles 3 and 4, magnetic brushes 5 with the magnetic abrasive materials aligned along the magnetic lines of force are aligned as in FIG. 5(B).

As shown in FIG. 5(A), a holding arm 20*a* of the robot is inserted into the support shaft hole 1*c* of the workpiece 1, and the workpiece 1 is firmly retained by the robot. The tip of the plate 1*b* of the workpiece 1 is inserted horizontally between said pair of the magnetic poles 3 and 4 from Y direction. The workpiece 1 is placed into the magnetic brushes 5 and is retained at vertical position at middle way between the magnetic poles 3 and 4. This is because, if the side of the plate 1*b* is inserted, distance between the magnetic poles 3 and 4 must be increased, and this hinders effective utilization of magnetic field between the magnetic poles 3 and 4.

Then, vibration with X-direction stroke of 7 mm, Y- and Z-direction strokes of 1 mm each, and vibration frequency of 40 Hz is applied on the magnetic poles 3 and 4, for example. When vibration is applied in X-, Y- and Z-directions on the magnetic poles 3 and 4 at the position of FIG. 5(B), the magnetic brushes 5 are vibrated similarly in X-, Y- and Z-directions. The magnetic abrasive material is brought into contact with the workpiece 1. Then, front and rear surfaces of the plate 1*b* and corner portions formed on outer periphery of the plate 1*b* are polished. This procedure can be used when surfaces of a plurality of plates 1*b* of the workpiece 1 are to be polished. However, processing force is weak because the magnetic brushes are in parallel to the surfaces of the plates 1*b*. Accordingly, in case it is wanted to deburr at inner depth of the plate 1*b* of the workpiece 1, polishing is performed approximately as follows:

The magnetic poles 3 and 4 are vibrated in horizontal and vertical directions at the position shown in FIG. 5(B) and processing is performed for a predetermined duration of time. Then, as shown in FIG. 6(A), the workpiece 1 is rotated counterclockwise (in C direction) and tilted at an angle of about 15° around axial line extending in the inserting direction of the workpiece 1. At this position, horizontal and vertical vibrations are applied, and the same processing as described above is performed. The processing at vertical position as shown in the figure by one-dot chain line and duration of processing at tilted position are adequately determined by the requirement level for the shape of the workpiece 1 and the treatment of corner portions. Further, after processing is performed at the tilted position shown in FIG. 6(A) for a predetermined duration of time, it is rotated in clockwise (in D direction) around the same axial line as described above, and the workpiece 1 is tilted at an angle of about 15° with respect to vertical position, and processing is performed at this position.

Each of the plates 1*b* of the workpiece 1 comprises two corner portions 2*a* and 2*b* formed on outer peripheral edge and two corner portions 2*c* and 2*d* formed on inner peripheral edge of the opening 1*e*. At the position shown in FIG. 5(B), it is possible to remove burrs, which protrude from the surface or the plate 1*b* toward the other plate (i.e. in a direction perpendicular to the surface of the plate 1*b*), but it is difficult to remove burrs protruding from outer peripheral edge of the plate 2 toward outside and burrs protruding from inner peripheral edge of the opening 1*e* toward inside (i.e. burrs protruding in a direction in parallel to the surface of the plate 1*b*).

In the processing performed at a position shown in FIG. 6(A), the magnetic brushes 5 aligned in an extension of magnetic line of force are brought into contact with the corner portions 2*a* and 2*d*, and it is possible to remove the burrs protruding from outer peripheral edge toward outside on the corner portion 2*a* and the burrs protruding from inner peripheral edge of the corner portion 2*d* toward inside and to process the corner portions 2*a* and 2*d* to the shape as desired (corner portion is beveled or finished with R-shaped surface). At the position with the workpiece 1 tilted in D direction in FIG. 6(A), chains of the magnetic abrasive materials aligned in the direction of magnetic fluxes are brought into contact with the corner portions 2*b* and 2*c*, and it is possible to remove the burrs protruding from outer peripheral edge on the corner portion 2*b* toward outside and the burrs protruding from outer peripheral edge on the corner portion 2*c* toward inside, and also to process the corners 2*b* and 2*c* to the shape as desired.

As shown in FIG. 6(B), tilt angle θ formed by the plate 1*b* (slit surface) and magnetic line of force determine an angle, at which the magnetic abrasive material 5*a* hits the workpiece 1, and this is a very important factor in this processing method. If the angle θ is too large, the force applied by the magnetic abrasive material on the workpiece is increased, and processing force is increased, whereas, in case of a workpiece with low rigidity, shape accuracy is decreased, being out of the range of the tolerance, and defective percentage is increased. The value of this angle θ is related to the value of vibration amplitude of relative movement. If amplitude is considerably low even when the value of θ is large, deterioration of shape accuracy due to low rigidity of the workpiece can be reduced to a certain value.

In case the workpiece is a carriage member for hard disk drive, selection of the magnetic abrasive material 5a is important. This is because there is strict requirement that magnetic powder or abrasive material must not remain on the carriage member. Therefore, the magnetic abrasive material 5a must not prick into and remain on the workpiece, and it is preferably a magnetic pin in form of a pin and has sharp edge. As shown in FIG. 6(B), this magnetic pin is used in the processing as it undergoes magnetic force so that longitudinal direction is directed in the direction of magnetic line of force. Under the influence of magnetic force, blade of edge of the end surface of the pin is always directed in a fixed direction and is used for processing.

Because the workpiece 1 is a non-magnetic material, magnetic line of force penetrates freely through the workpiece 1 even when the workpiece is tilted. In this respect, it is possible to treat many corner portions formed on surface of the precision parts of complicated 3-dimensional structure at one time, and it is also easy to automate the processing. In particular, efficient treatment can be performed for the sites inside the workpiece such as opening or hole. For example, it is possible to improve performance characteristics and quality of hard disk and to reduce manufacturing and processing cost.

Figure 7:
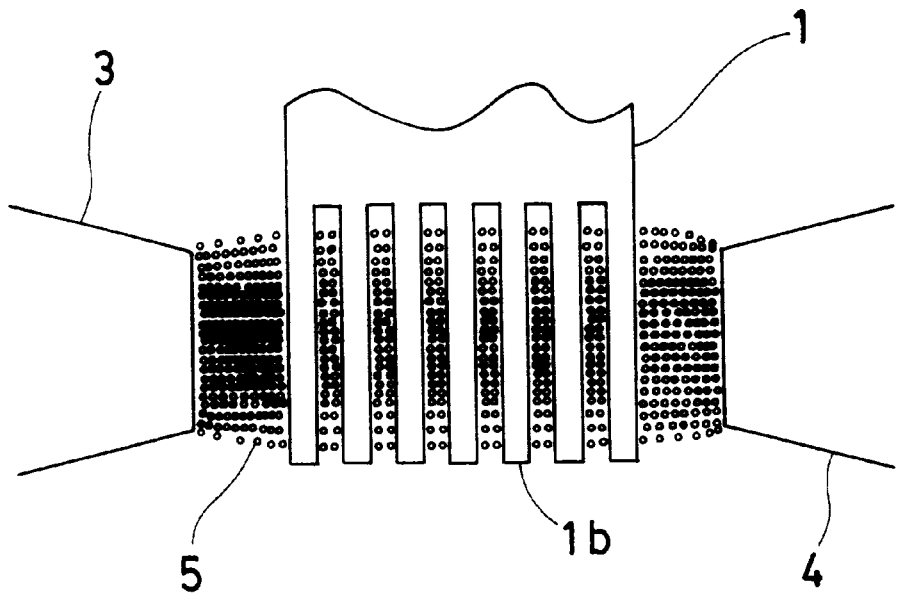
FIG. 7 is a schematic drawing to explain another example of the method for magnetic processing according to the present invention.

FIG. 7 shows another example of the processing method. In this case, the surface of the plate 1b of the workpiece 1 is directed almost perpendicularly to the direction of magnetic line of force. Because magnetic line of force penetrates through the workpiece 1 made of non-magnetic material, even when the plate 1b of the workpiece 1 is inserted into the magnetic brushes 5 retained in the magnetic field between the magnetic poles 3 and 4, there is almost no change in the conditions of the magnetic brushes 5 retained along the magnetic line of force, and the magnetic abrasive material contained in the magnetic brushes enters between the plates 1b and is re-aligned almost in the initial conditions. When the magnetic poles 3 and 4 are vibrated in a direction in parallel to the surface of the plate 1b under this condition or the workpiece 1 is tilted as described above, the magnetic abrasive material is rubbed against the surface of the plate 1b, and the surface or corner portion of the plate 1b can be polished.

Then, the magnetic abrasive material is brought into contact with the surface of the plate 1b with a predetermined pressure depending upon the condition of the magnetic field at the site where it is positioned, and polishing is performed with this processing pressure. In the magnetic field, magnetic force (processing force) to be applied on the magnetic abrasive material is given by:

$$Fx = kD^3 \chi H \, (\delta H / \delta x)$$

$$Fy = kD^3 \chi H \, (\delta H / \delta y) \quad (1)$$

$$Fz = kD^3 \chi H \, (\delta H / \delta z)$$

where Fx, Fy and Fz each represents processing force in the directions x, y and z respectively, k is a constant, D represents grain size of abrasive material, X represents magnetic susceptibility of the abrasive material, H represents magnetic field intensity, and (δH/δx), (δH/δy), and (δH/δz) each represents changing ratio of magnetic field intensity in directions x, y, and z respectively. According to these equations, magnetic force applied on the magnetic abrasive material is proportional to volume of the magnetic abrasive material and is also proportional to magnetic susceptibility of the magnetic abrasive material, and it is increased in proportion to magnetic field intensity and its changing ratio.

Therefore, on the magnetic pin 5a with axial direction of the pin (angle θ) different from the direction of magnetic line of force as shown in FIG. 6(B), a moment M as given by the following equation is applied, and the pin tends to be directed in the direction of magnetic line of force at all times.

$$M = V \cdot X \cdot H^2 \cdot \sin \theta$$

By this moment M applied on the magnetic pin, the magnetic pin tends to be directed in the direction of magnetic line of force at all times during processing, and sharp blade formed on the edge can be applied on the surface of the workpiece. Because the moment is related to volume V of the pin, i.e. diameter and length of the pin, the definition of shape and dimension of the pin is very important.

Figure 8:
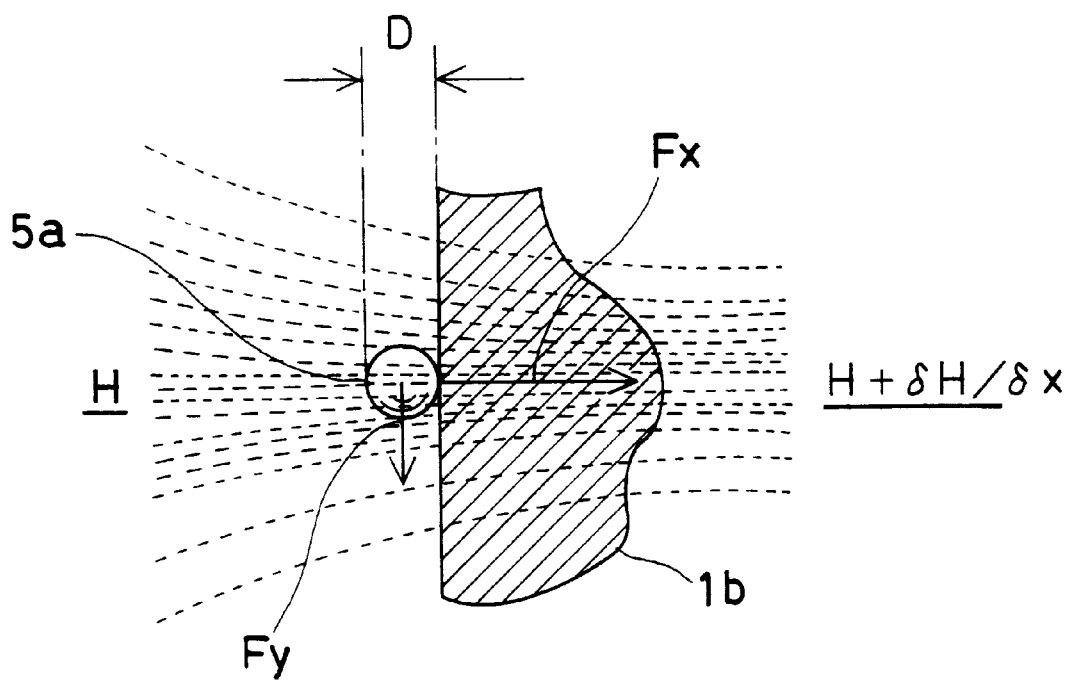
FIG. 8 is to explain operation on surfaces of a workpiece and a magnetic abrasive material in the present invention.

FIG. 8 shows relationship between the grain-like magnetic abrasive material 5a and the surface of the plate 1b. The magnetic abrasive material 5a contacts the surface of the plate 1b. When the magnetic abrasive material 5a is moved downward in the figure, the surface of the plate 1b is polished by processing pressure Fx and retaining force Fy as shown in the figure. The processing pressure Fx is a pressure of the magnetic abrasive material necessary for polishing, and the retaining force Fy is a force, which overcomes polishing resistance and retains the magnetic abrasive material 5a to generate relative movement. To polish the surface of the plate 1b, it is necessary to have both the processing pressure Fx and the retaining force Fy. If either one of them is not present, polishing effect cannot be achieved. That is, if the processing pressure Fx is not present, polishing force on the surface of the plate 1b cannot be obtained even when the retaining force is present. On the other hand, if the retaining force Fy is not present, relative movement does not occur between the magnetic abrasive material 5a and the workpiece, and polishing cannot be accomplished.

The processing pressure Fx and the retaining force Fy are both generated in accordance with the above equations (1). When grain size and magnetic susceptibility of the magnetic abrasive material 5a are kept at constant level, the processing pressure Fx and the retaining force Fy are determined at each site, depending upon magnetic field intensity and its changing ratio in the magnetic field. The closer it is to the magnetic poles 3 and 4, the more the magnetic field intensity is increased. In case the magnetic poles are arranged face-to-face to each other and closer to each other as in the above embodiment, there is no substantial difference according to the site on the plate 1b. On the other hand, in the changing ratio of magnetic field intensity, relatively high changing ratio in the direction along the magnetic line of force is noted near the magnetic pole, and high changing ratio of magnetic field intensity is noted in upper and lower outer peripheries of the space between magnetic poles where the magnetic brushes 5 are retained as shown in FIG. 6. Further, the changing ratio of magnetic field intensity is relatively low at the center of the space between the magnetic poles. With the circumstances as such, stronger polishing effect is provided on outer peripheral side of the space between the magnetic poles according to the distribution of the changing ratio of the magnetic field intensity.

Therefore, in the example shown in FIG. 5(B), treatment is carried out with the direction of magnetic line of force basically in parallel to the surfaces of the plates. In this case, it is difficult to sufficiently maintain the retaining force Fy as shown in FIG. 8. When the magnetic poles 3 and 4 are vibrated in vertical direction at the position as shown in FIG.

7, the change of magnetic field intensity is particularly strong near upper portion and lower portion of the area where the magnetic abrasive material is retained, and the retaining force Fy can be maintained sufficiently.

Figure 9:
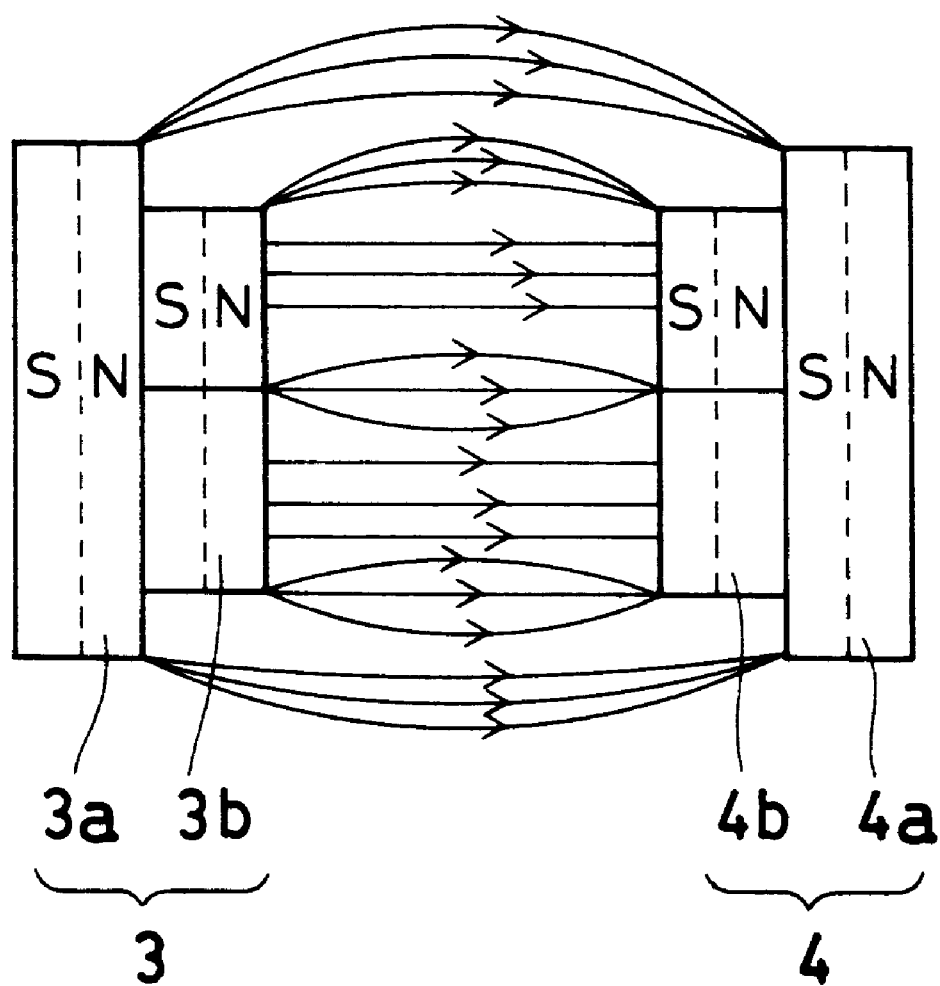
FIG. 9 is a schematic drawing to show change of magnetic field intensity of the embodiment of FIG. 3.

As explained in connection with the equations (1), magnetic force in x direction applied on magnetic material increases in proportion with magnetic field intensity and the changing ratio in x direction. For this reason, as explained in connection with FIG. 3, the magnetic poles 3 and 4 comprise the two magnetic poles 3a and 3b and the poles 4a and 4b each in rectangular shape and laminated on each other in the present embodiment. As shown in FIG. 3(B), these are fixed at such positions that one magnetic pole 3a is rotated at an angle of 45° with respect to the other magnetic pole 3b. Therefore, as shown in FIG. 9, a plurality of portions with stronger magnetic field intensity are formed in the corner portions of the magnetic poles 3a and 4a and the magnetic poles 3b and 4b. The corner portions of the magnetic poles are increased, and as a result, uneven magnetic field (to be described later) with strong and weak parts in the magnetic field is formed. Thus, it is possible to firmly retain the magnetic abrasive material made of weak magnetic material in the magnetic field. This makes it possible to increase processing force and to improve polishing efficiency.

Figure 10:
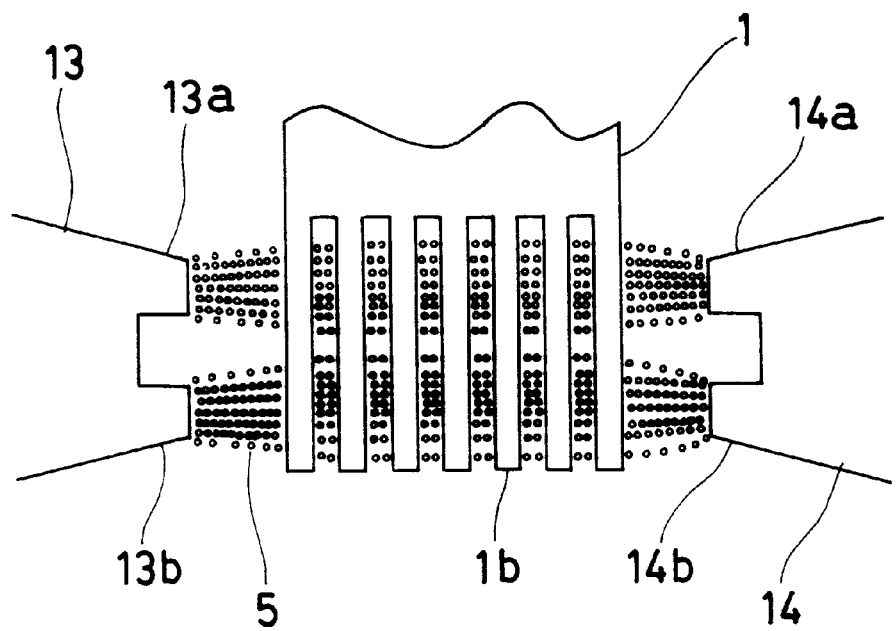
FIG. 10 is a schematic drawing to show another embodiment of the present invention.
Figure 11:
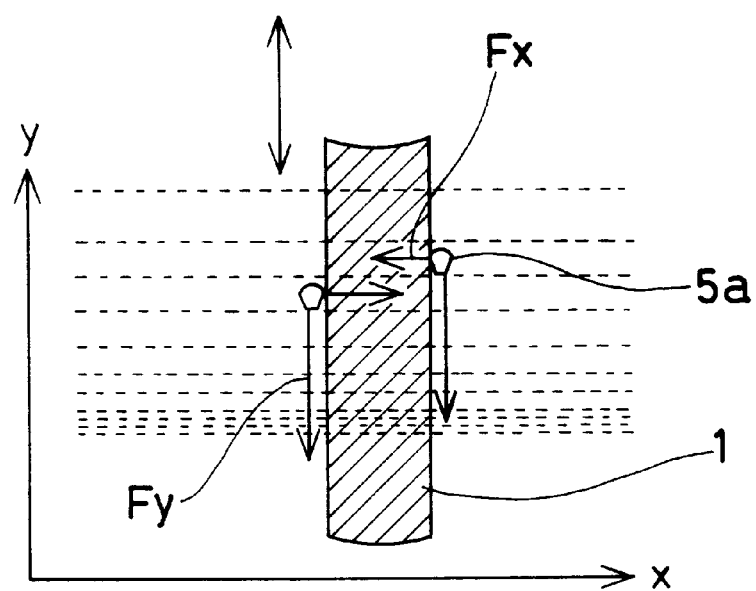
FIG. 11 is a drawing to explain operation on surfaces of a workpiece and a magnetic abrasive material in the embodiment of FIG. 10.
Figure 12:
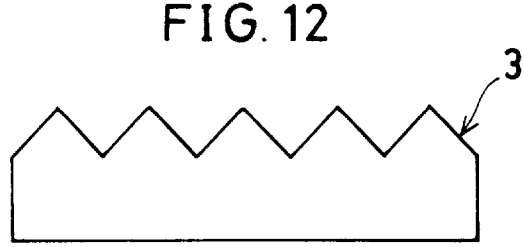
FIG. 12 is a schematic drawing of a magnetic pole of another embodiment of the invention.
Figure 13:
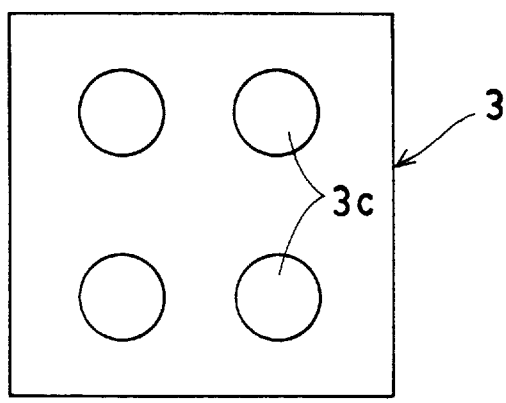
FIG. 13 is a schematic drawing of a magnetic pole of still another embodiment of the present invention.

FIG. 10 shows another embodiment of the invention, in which magnetic poles in a configuration different from that of the above embodiment is used. In this embodiment, a plurality of convex portions 13a, 13b, 14a and 14b are provided on outer peripheries of a pair of magnetic poles 13 and 14. In the magnetic field formed between the magnetic poles 13 and 14, magnetic field intensity is changed in a direction (in vertical direction in the figure) perpendicular to the direction of magnetic line of force. In this respect, when the magnetic poles 13 and 14 are reciprocally moved in vertical direction under the condition shown in FIG. 10, the retaining force Fy to the workpiece 1 of the magnetic abrasive material is retained at a position with high magnetic field intensity of uneven magnetic field even when there is resistance and relative movement occurs with respect to the surface of the workpiece because the retaining force is increased due to change of magnetic field intensity. As a result, the better polishing efficiency is obtained. To form or increase uneven magnetic field in the magnetic pole, the magnetic pole may be designed to have triangular or conical cross-section and a plurality of concave and convex portions may be provided as shown in FIG. 12, or a plurality of non-magnetic pole portions 3c may be provided in the magnetic pole 3 as shown in FIG. 13.

Figure 15:
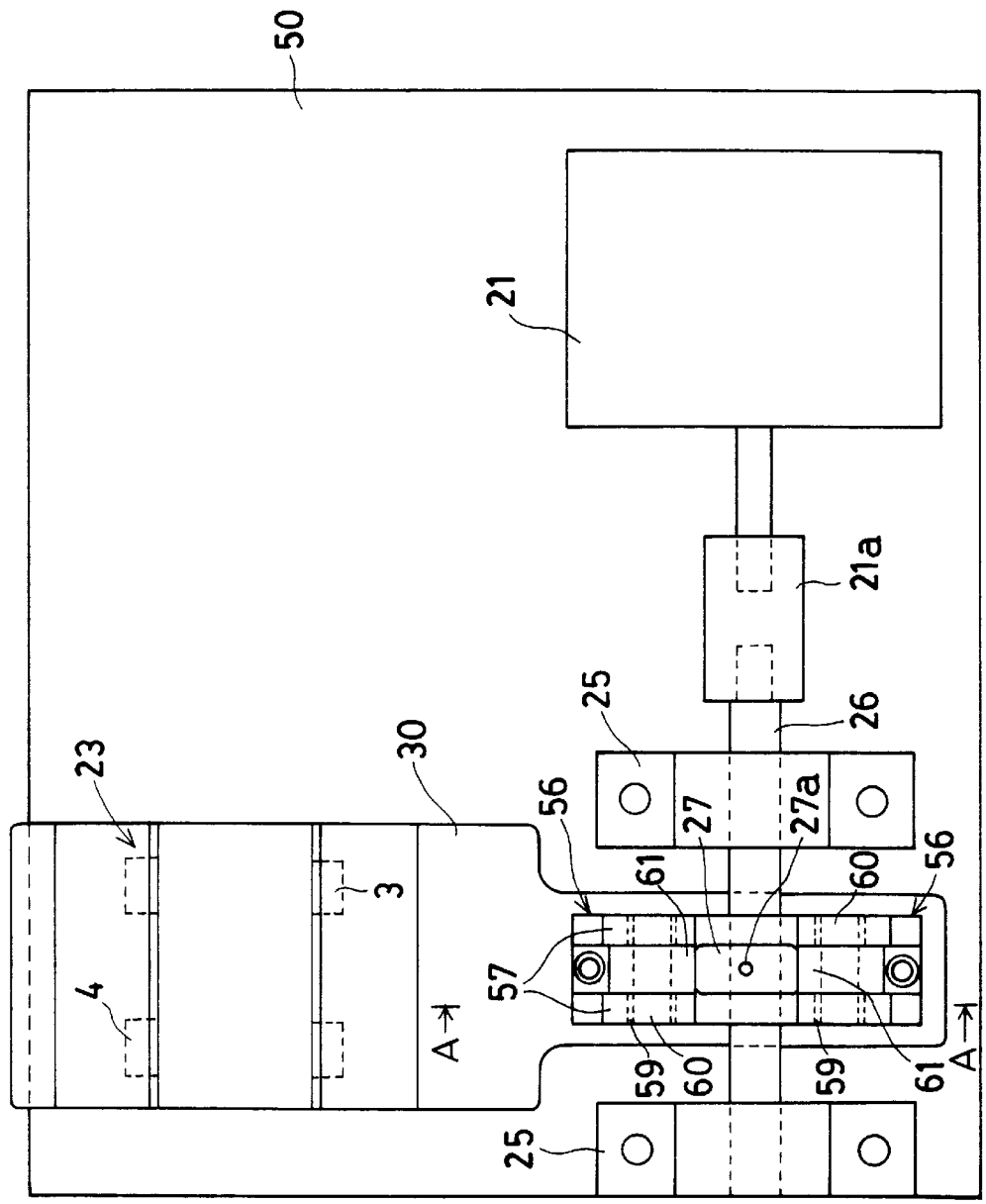
FIG. 15 is a plan view of an overall arrangement of another embodiment of a vibration generating mechanism in the present invention.
Figure 16:
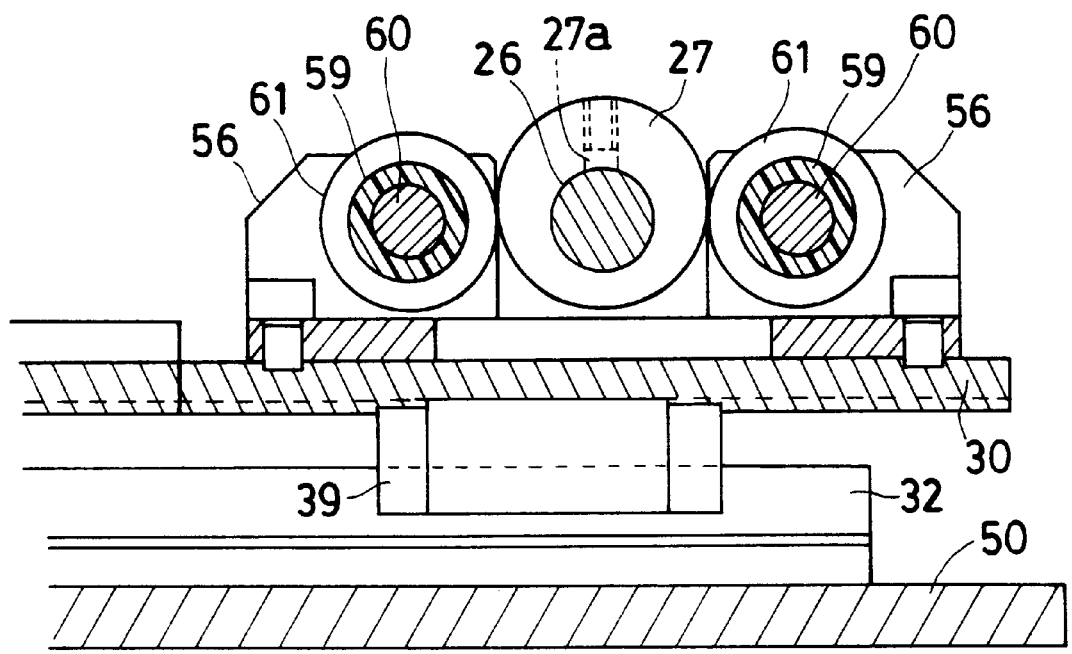
FIG. 16 is a cross-sectional view along the line A—A of FIG. 15 as seen from the direction of arrow.
Figure 17:
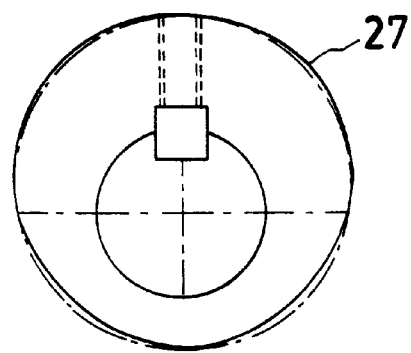
FIG. 17 is a drawing to show a variation of a cam in FIG. 16.

FIG. 15 to FIG. 18 each represents another embodiment of the vibration generating mechanism in the present invention. FIG. 15 is a plan view of an overall arrangement, FIG. 16 is a cross-sectional view along the line A—A of FIG. 15 as seen from the direction of arrow, FIG. 17 shows a variation of cam, and FIG. 18 is to explain operation. In the following, the same component as in the above embodiment is referred by the same symbol, and detailed description is not given.

In FIG. 15 and FIG. 16, the vibration generating mechanism 22 comprises bearings 25 and 25 fixed on a base 50, a rotation shaft 26 rotatably supported between the bearings 25 and 25 and connected to an electric motor 21 via a coupling 21a, and an eccentric cam 27 fixed on the rotation shaft 26 by a pin 27a. Magnetic pole units 23 are fixed on one side of a base 30, and a pair of roller support members 56 are fixed on the other side of the base 30 to squeeze the rotation shaft 26. On bearings 57 of the roller support members 556, a rotation shaft 60 is pivotally supported via elastic rings 56 made of a material such as urethane rubber, and an operation roller 61 is disposed on each of the rotation shafts 60. On both sides of the eccentric cam 27, a pair of operation rollers 61 are closely arranged.

In the above example, the eccentric cam 27 is designed in circular shape, while it may be designed to have deformed curved surface with respect to the circular shape shown by one-dot chain line.

Description will be given now on operation of the vibration generating mechanism 22 with the above arrangement referring to FIG. 18.

When the eccentric cam 27 is rotated as shown by an arrow under the condition shown in FIG. 18(A), the eccentric cam 27 is pressed on the operation roller 61 at right side against the force of the elastic ring 59. The, as shown in FIG. 18(B), the base 30 is moved rightward. When rotation angle of the eccentric cam 27 exceeds 90°, the base 30 is moved leftward by resilient force of the elastic ring 59 as shown in FIG. 18(C). When rotation angle of the eccentric cam 27 exceeds 180°, the eccentric cam 27 is pressed to the operation roller 61 on left side against the force of the elastic ring 59 as shown in FIG. 18(D). Then, the base 30 is moved leftward. When rotation angle of the eccentric cam 27 exceeds 270°, the base 30 is moved rightward by resilient force of the elastic ring 59 and is turned to the condition shown in FIG. 18(A).

Subsequently, the above movement is repeated, and it is vibrated as shown in FIG. 18(E). In this embodiment, the sliding rod 29 shown in FIG. 1 is not used, and the base 30 of the magnetic pole units 23 is directly vibrated. This makes it possible to simplify the vibration mechanism and to reduce vibration noise because vibration is given via the elastic ring 59.

Figure 19:
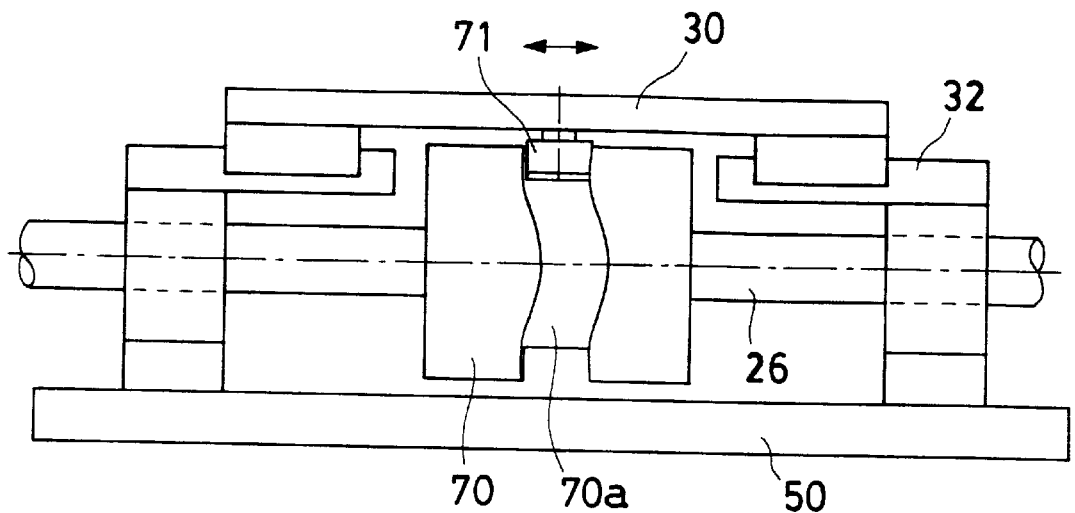
FIG. 19 shows another embodiment of the vibration generating mechanism in the present invention, where
Figure 19:
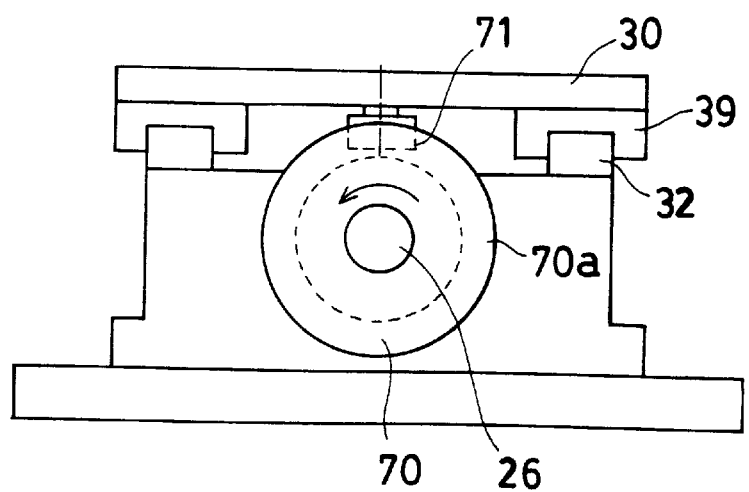

FIG. 19 shows still another embodiment of the vibration generating mechanism of the present invention. FIG. 19(A) is a side view, and FIG. 19(B) is a front view of the embodiment. In this embodiment, a cam 70 having a cam groove 70a is fixed on a rotation shaft 26, and an engaging roller 71 is rotatably mounted on lower surface of the base 30, and the engaging roller is engaged in the cam groove 70a. In this embodiment, when the rotation shaft 26 and the cam 70 are rotated, the engaging roller 71 is moved along the configuration of the cam groove 70a, and the base 30 is moved leftward or rightward as shown in FIG. 19(A). According to this embodiment, it is possible to further simplify the vibration mechanism because the sliding rod 29 of FIG. 1 or the roller support member of FIG. 15 are not used.

Figure 20:
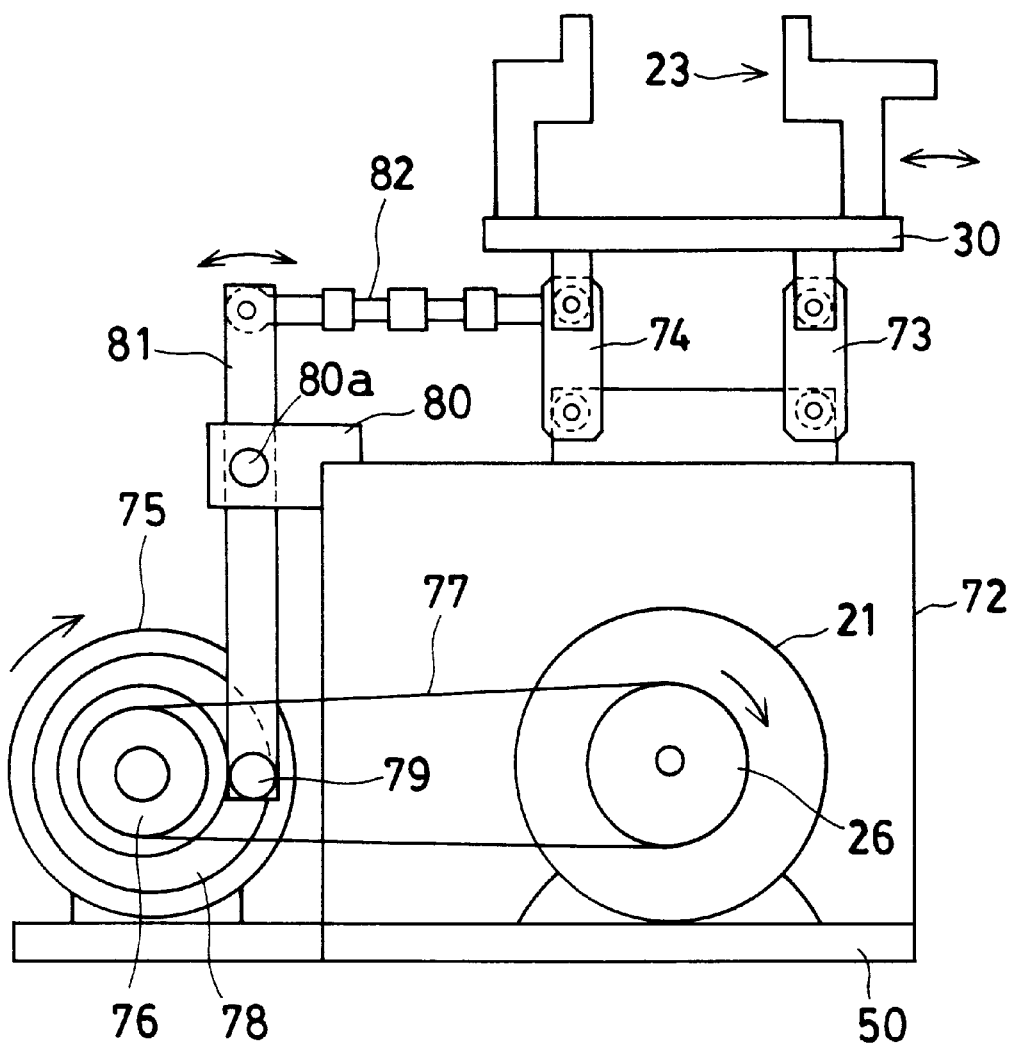
FIG. 20 is a side view of still another embodiment of the vibration generating mechanism in the present invention.

FIG. 20 is a side view of still another embodiment of the vibration generating mechanism of the present invention. A motor 21, an eccentric roller 75 and a housing 72 are fixed on a base 50, and a base 30 for magnetic pole units 23 is movably supported on the housing via a pair of links 73 and 74. A belt 77 is stretched over rotation shafts 26 and 76 of the motor 21 and the eccentric roller 75. On the side of the eccentric roller 75, an eccentric groove 78 deviated with respect to the center of rotation is provided, and a rotation pin 79 is engaged in the eccentric groove 78. On the housing 72, a vertical link 81 is movably supported on a shaft 80a via a support member 80. On the lower end of the vertical link 81, the rotation pin 79 is rotatably supported, and a vertical link 82 is rotatably connected to the upper end of the link 81.

In this embodiment, when the rotation shaft 26 and the eccentric roller 75 are rotated, the rotation pin 79 is moved along the configuration of the eccentric groove 78, and the vertical link 81 is moved as shown by an arrow in the figure. This movement is transmitted to the base 30 via the horizontal link 82 and the link 74. As a result, the base 30 is vibrated leftward and rightward.

In the above, description has been given on the present embodiment referring to the embodiments, while the invention is not limited to the above embodiments, and various changes and modifications can be made. For example, in the embodiments, magnetic field intensity is changed by forming various types of corner portions, convex and concave portions or non-magnetic pole portion on the surface of the magnetic pole, whereas it is also possible to form an uneven magnetic field by various other methods. For example, a plurality of magnetic poles may be arranged with spacings between them, or magnetic poles with different magnetic field intensities may be arranged, or magnetic pole portions with different magnetic field intensities may be provided. Also, it is possible to use a magnetic pole of electromagnetic solenoid as the magnetic pole. In this case, the magnetic field intensity can be controlled by amount of electric current of the electromagnetic solenoid.

In the above embodiments, 2-dimensional or 3-dimensional vibration is given to the magnetic pole units 23 to perform processing, whereas it is possible to further improve evenness of deburring or beveling of corner portions of the workpiece by applying various types of vibration on the workpiece 1. For example, in addition to rotation, revolving or swinging, high frequency vibration with fine stroke may be given to the vibrator 36 on the robot 20. In general, complicated vibration is more preferable to maintain evenness of the treatment or to improve treatment efficiency. In so doing, the dilemma in the arrangement of processing apparatus can be overcome, e.g. when repeating speed (number of vibrations) is increased, amount of processing is increased but it is difficult to maintain moving stroke to provide high evenness of the processing. If moving stroke is increased, it is difficult to have higher repeating speed. By combining a plurality of types of movement, processing efficiency can be improved, and evenness of processing or range of processing can be maintained. In particular, in the processing such as polishing, cumulative effect of a plurality of types of movement can be obtained, and quality of the polished surface can be improved.

It is preferable that the frequency of vibration is increased to some extent in a range as allowable in terms of mechanism to improve processing efficiency. Further, it is preferable that vibration stroke is made equal to or lower than the frequency to form corner portions of the workpiece in order that even and elaborate processing can be performed.

In the above embodiments, magnetic field is provided between a pair of magnetic poles opposed to each other, while there is no need to arrange the magnetic poles face-to-face to each other, and it will suffice if magnetic field can be provided, or magnetic field may be formed between 3 or more magnetic poles.

In the above embodiments, description has been given on the case where surface polishing or polishing treatment such as deburring, beveling, etc. of the workpiece is performed using magnetic abrasive material, whereas, the present invention is not limited to the polishing processing, and the invention can be applied to various types of surface treatment which can be performed using magnetic abrasive material, e.g. honing treatment by striking workpiece surface with grain-like objects to form coarse surface, washing treatment using a washing liquid impregnated with grain-like objects or attached around grain-like objects to wash surface of the workpiece, or coating treatment performed by coating a liquid containing grains on surface of the workpiece.

As described above, in normal processing or treatment, it is necessary to fix cutting tools and other means on some other device. In the present invention, however, the magnetic abrasive material made of weak magnetic material is used instead and is magnetically retained in the magnetic field. Accordingly, there is no need to fix or set the tool. The method for processing using beam of magnetic line of force and an apparatus for performing said method according to the present invention are very effective as the means to perform surface processing or surface treatment of precision parts, which tend to be more and more complicated and compact in recent years.

What is claimed is:

1. A method for processing using beam of magnetic line of force, comprising the steps of:

retaining magnetic abrasive material consisting of weak magnetic particles with sharp edges in a magnetic field formed between magnetic poles provided in an open space and forming magnetic brushes, arranging, in said magnetic brushes, a workpiece made of non-magnetic material having slits with narrow width from outer surface toward inside of said workpiece, and relatively vibrating in at least a horizontal direction said magnetic poles and said workpiece to process surfaces of said slits.

2. A method for processing using beam of magnetic line of force according to claim 1, wherein said slit surface is arranged in parallel to the magnetic field, and the slit surface is tilted with respect to the magnetic field.

3. A method for processing using beam of magnetic line of force according to claim 1, wherein magnetic field intensity is changed in relative vibrating direction of said workpiece.

4. A carriage member for hard disk drive processed by the method for processing using beam of magnetic line of force according to claim 1.

5. An apparatus for processing using beam of magnetic line of force, comprising:

magnetic pole units each connected to a vibration generation mechanism, said vibration generation mechanism including a respective sliding rod for generating vibration for each magnetic pole unit individually, at least a pair of magnetic poles arranged on each of said magnetic pole units with spacings, magnetic abrasive material consisting of weak magnetic particles with sharp edges placed between said pair of magnetic poles to form magnetic brushes, a retainer for retaining a workpiece made of non-magnetic material in said magnetic brushes, and slits with narrow width formed from outer surface toward inside of said workpiece, whereby the magnetic brushes are vibrated by said vibration generating mechanism to process surface of the workpiece.

6. An apparatus for processing using beam of magnetic line of force according to claim 5, wherein said vibration generating mechanism comprises a rotation shaft connected to an electric motor, an eccentric cam fixed on said rotation shaft, an operation plate mounted on said eccentric cam via bearings, and a sliding rod connected between said operation plate and said magnetic pole unit.

7. An apparatus for processing using beam of magnetic line of force according to claim 5, wherein said vibration generating mechanism comprises a rotation shaft connected to an electric motor, an eccentric cam fixed on said rotation shaft, operation rollers closely arranged on both sides of the eccentric cam, and roller support members for supporting said operation rollers via elastic rings, whereby said roller support members are fixed on a base for fixing the magnetic pole units.

8. An apparatus for processing using beam of magnetic line of force according to claim 5, wherein said vibration generating mechanism comprises a rotation shaft connected to an electric motor, an eccentric cam fixed on said rotation shaft, a cam groove formed on said eccentric cam, and engaging rollers rotatably mounted on a base for fixing the magnetic pole units, wherein said engaging rollers are engaged in said cam groove.

9. An apparatus for processing using beam of magnetic line of force according to claim 5, wherein said vibration generating mechanism comprises an eccentric roller connected to an electric motor via a belt, an eccentric groove formed on said eccentric roller, and a rotation pin engaged in said eccentric groove, whereby said rotation pin is connected to a base for fixing the magnetic pole units via a plurality of links.

10. An apparatus for processing using beam of magnetic line of force according to claim 5, wherein said vibration generating mechanism and said magnetic pole units are mounted on a base, and vibration is given to said base.

11. An apparatus for processing using beam of magnetic line of force according to claim 5, wherein said retainer is a robot, said workpiece has a support shaft hole, and a retaining finger of the robot is inserted into said support shaft hole and the workpiece is retained.

12. An apparatus for processing using beam of magnetic line of force according to claim 5, wherein said magnetic abrasive material is a pin made of weak magnetic material.

13. An apparatus for processing using beam of magnetic line of force according to claim 5, wherein high frequency vibration is given to said workpiece.

14. An apparatus for processing using beam of magnetic line of force according to claim 11, wherein processing surface of the workpiece is 3-dimensionally changed using said robot with respect to direction of the magnetic field generated by the magnetic poles.

15. An apparatus for processing using beam of magnetic line of force according to claim 5, wherein a magnetic brush control plate made of non-magnetic material is provided on outer periphery of each of said magnetic poles.

16. An apparatus for processing using beam of magnetic line of force according to claim 5, wherein an uneven magnetic field is formed on inner side of said pair of opposing magnetic poles.

17. An apparatus for processing using beam of magnetic line of force according to claim 16, wherein said pair of magnetic poles are arranged in such manner that two magnetic poles each in rectangular shape are laminated on each other, and one of the magnetic pole is rotated at an angle of 45° with respect to the other magnetic pole.

18. An apparatus for processing using beam of magnetic line of force according to claim 5, wherein an injection nozzle for injecting liquid used for washing or processing is arranged between said magnetic poles.

* * * * *